June 19, 1956 P. L. KERSHAW 2,750,837
OPTICAL PYROMETERS
Filed June 25, 1952 3 Sheets-Sheet 1
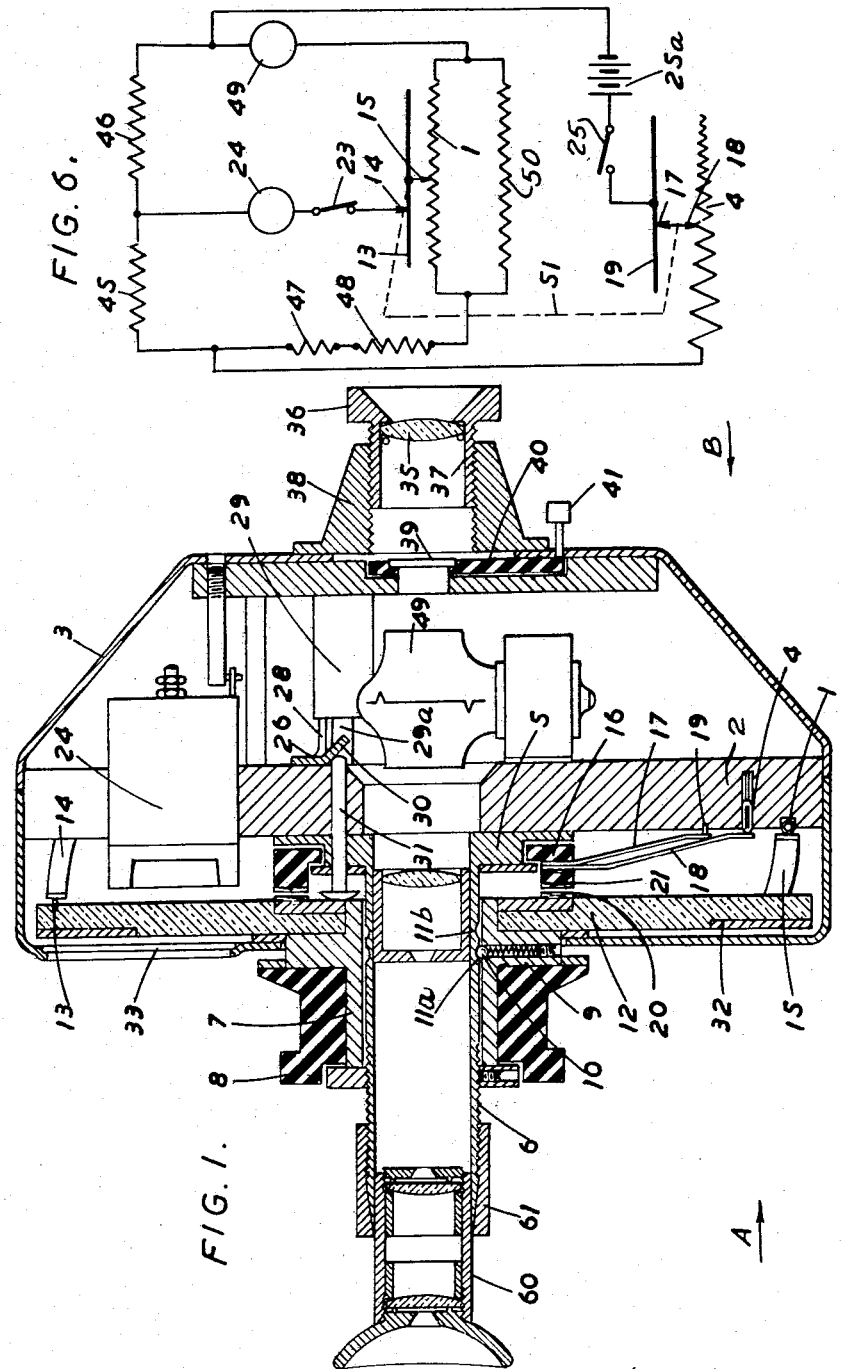
Inventor
PETER LESLIE KERSHAW
By
Leon M. Strauss June 19, 1956   P. L. KERSHAW   2,750,837
OPTICAL PYROMETERS
Filed June 25, 1952   3 Sheets-Sheet 2
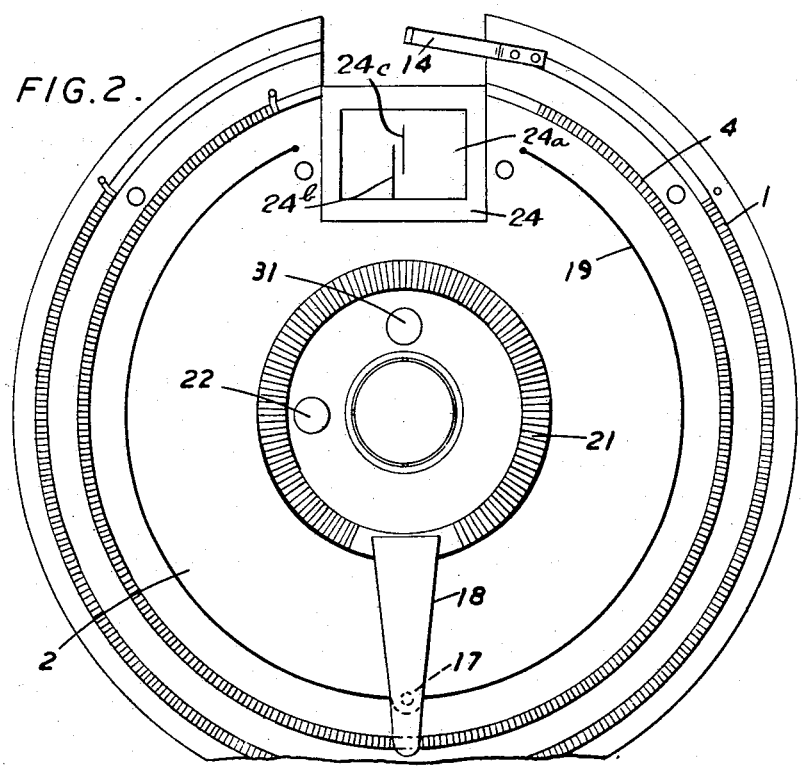
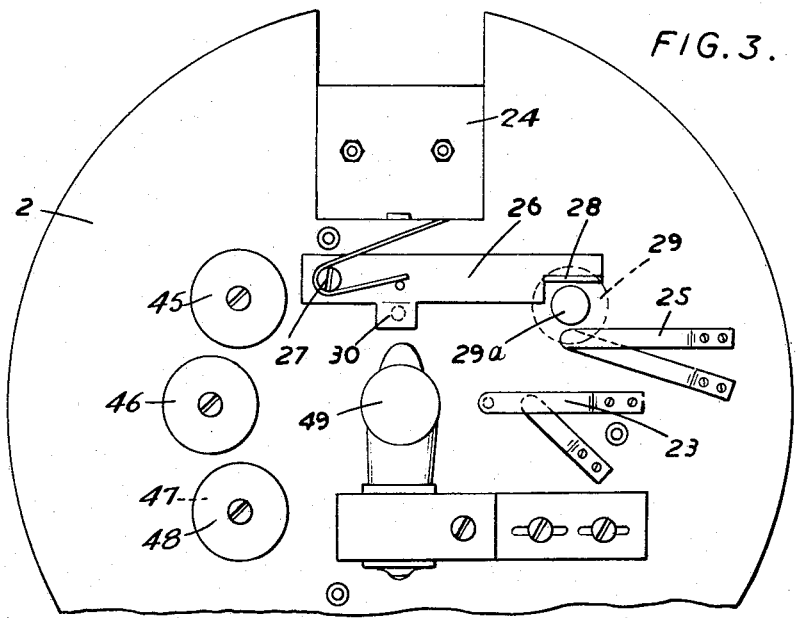
Inventor
*PETER LESLIE KERSHAW*
By

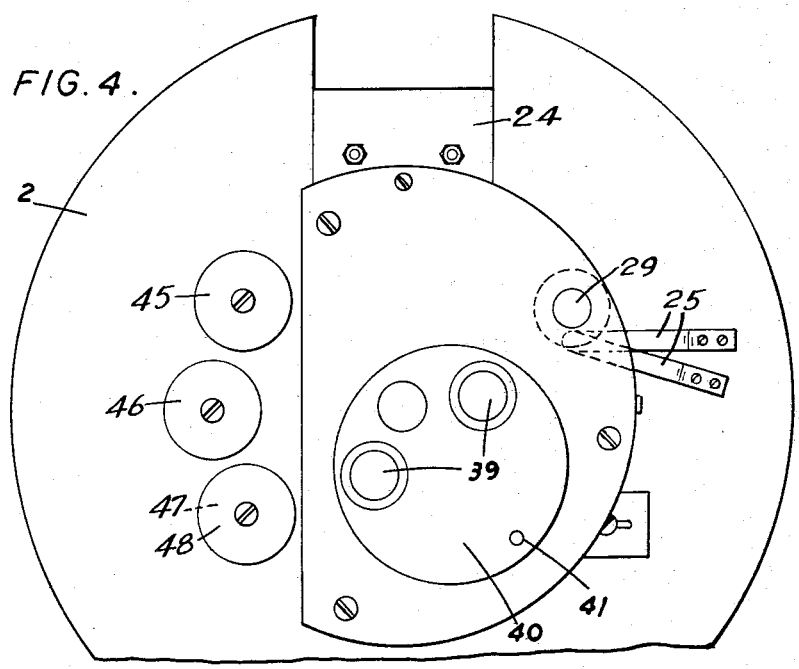
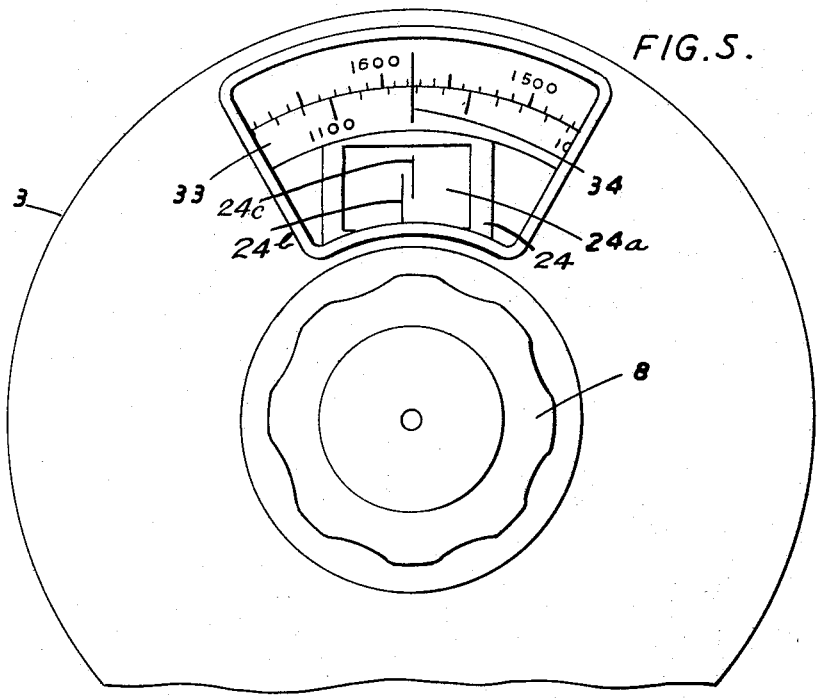

United States Patent Office 2,750,837
Patented June 19, 1956

2,750,837

OPTICAL PYROMETERS

Peter Leslie Kershaw, West Twyford, London, England, assignor to Tinsley (Industrial Instruments) Limited, London, England, a British company Application June 25, 1952, Serial No. 295,506

Claims priority, application Great Britain July 2, 1951

2 Claims. (Cl. 88—22.5)

This invention relates to optical pyrometers of the type in which the brightness of the object whose temperature is to be measured is compared with that of an incandescent lamp filament, the current in which is varied, the filament being included in a bridge circuit so that variations in the lamp resistance can be used to indicate the temperature of the object and wherein an operating member common to the lamp current adjusting means and to the bridge adjustment is connectable to both adjustments simultaneously so that the bridge is automatically maintained approximately in balance as the lamp current is adjusted, and is disconnectable from the lamp current adjustment so that further movement of the common operating member after the lamp current has been adjusted can be used to bring the bridge to precise balance.

According to the present invention the bridge adjustment comprises a slide wire along which moves a galvanometer terminal carried by the operating member, the lamp current being adjusted by a rheostat of which the movable contact is carried by a member normally disconnected from the operating member, but engageable therewith by an axial movement of said operating member so that, on moving the operating member axially and then rotating it, the two contacts can be moved simultaneously until the lamp brightness is matched after which the operating member can be withdrawn to disengage the rheostat contact so that further rotation of the operating member moves the galvanometer terminal alone until balance is attained.

According to a further feature of the invention, the galvanometer key is operated to connect the galvanometer in circuit by the action of moving the common operating member into the position in which it is disengaged from the rheostat contact.

According to yet another feature of the invention, a key for connecting the battery into circuit is held locked when the common operating member is disengaged from the rheostat contact and is released for operation when the operating member is moved to engage the rheostat contact, means being provided for maintaining the key released after disengagement of the operating member.

In order that the invention may be more completely understood a preferred construction according thereto will now be described by way of example with reference to the accompanying diagrammatic drawings in which:

Figure 1 shows a cross section of the instrument.

Figure 2 is a view in the direction of the arrow A in Figure 1 with the eye piece, the operating knob, the scale and the slide wire brush assembly removed.

Figure 3 is a view in the direction of the arrow B in Figure 1 with the lens mounting cover, filter shutter and mounting plate removed.

Figure 4 is a view similar to that shown in Figure 3 but with the filter shutter and mounting plate in position.

Figure 5 is an outside elevation in the direction of the arrow A in Figure 1 and Figure 6 is a wiring diagram of the instrument.

In the construction illustrated in the drawings the slide wire 1, which is circular, is mounted on a plate 2 fixed within the casing 3, and the rheostat 4, which is also circular, and concentric with the slide wire 1, is also mounted on said plate 2.

Attached by a flange 5 to the fixed plate 2 is a sleeve 6 on which is rotatably mounted a sleeve 7 having fixed to it an operating knob 8. Sleeve 7 has a collar 9 bored radially to receive a spring-loaded ball detent 10 which engages one or other of two recesses 11a, 11b in the sleeve 6, to retain the knob 8 in an outer position (shown in Fig. 1) or in an inner position to the right of the position shown in Fig. 1.

Fixed to the sleeve 7 is a disc 12 carrying a collector ring 13 cooperating with a fixed brush 14 connected to the galvanometer 24 through switch contacts 23, said disc 12 also carrying a brush 15 movable along the slide wire 1 when the disc 12 is rotated by rotation of the knob 8.

Rotatable about the flange 5 is a member 16 carrying two brushes 17, 18 which are in electrical connection with each other. The brush 17 engages a collector ring 19 mounted on the plate 2 and the brush 18 engages the rheostat 4.

The disc 12 carries one part 20 of a very fine toothed dog clutch of which the other part 21 is mounted on the member 16.

To adjust the slide wire and rheostat the knob 8 is pushed in whereby the clutch 20, 21 is engaged after which the knob is turned so that the disc 12 is rotated to move the slide wire brush 15 and carries with it the member 16 on which are mounted the rheostat brushes 17, 18 so that the latter are moved simultaneously with the slide wire brush 15.

When lamp brightness is matched the knob 8 is released and is returned to its outer position thereby disengaging the clutch after which further rotation of the knob turns the disc 12 alone to move the slide wire brush 15 alone until balance is obtained.

The operating knob 8 bears against a pin 22 similar to pin 31 (hereinafter described), so that, when knob 8 is pushed in, it moves pin 22 axially, the inner end of pin 22 acting on switch contacts 23 of the galvanometer 24 to open them. When knob 8 is pulled out, the galvanometer contacts 23 close.

In order to prevent actuation of the battery switch contacts 25 when the knob 8 is in the out position while yet leaving the battery switch in the operated position after the knob has been pulled out again a latch 26 is provided which normally holds the battery switch key 29 in the inoperative position. For this purpose the latch 26 is pivoted to the plate 2 at 27 and has a lug 28 engaging behind the battery key 29 and prevents it from being pushed in to the left in Figure 1.

The latch 26 also has a cam lug 30 which is engaged by a pin 31 operable by the knob 8. When the latter is pushed in the pin 31 moves to the right in Figure 1 and by engagement with the lug 30 lifts the latch 26 clear of the battery key 29.

When the key 29 is pushed in it passes under the lug 28 and holds the latch 26 raised in the inactive position until the battery key 29 has been pulled out again to the off position whereupon the latch 26 drops down into engagement with the reduced portion 29a of the key 29 thereby latching the latter in the off position.

The disc 12 is made of transparent material and carries a scale 32, the galvanometer 24 being mounted behind the disc 12.

The window of the galvanometer is shown at 24a in Figs. 2 and 5, the galvanometer pointer being shown at 24b and the center mark on the galvanometer scale at 24c.

To compensate for variation in the battery voltage the rheostat brushes 17, 18 are displaced relative to the slide wire brush 15 and the rheostat track therefore has to be longer than the slide wire track to allow for this displacement.

The casing 3 is provided with a window 33 through which the scale 32 may be read, a cursor line 34 being engraved on the back of the window.

The object lens 35 is mounted in a holder 36 having a screw-threaded tube 37 engaging in the threaded end 38 of the telescope whereby focussing may be readily effected by rotating the holder.

No shutter is provided over the lens because the latter is situated at the front of the instrument where it can easily be cleaned, thereby obviating the disadvantage arising out of the use of a shutter due to the fact that dirt could not be removed from the lens while the shutter was operating, until the instrument was dismantled.

Neutral filters 39 for range change are mounted on a rotary shutter 40 thereby rendering the range changing operation extremely simple, the shutter 40 having an operating knob 41.

The manner of use of the instrument, according to the invention is as follows:

The body of the instrument is held in the left hand, the filament is focussed by adjusting the eye piece 60 which is clamped by turning a collet screw 61 on the telescope tube 6. The object is focussed by turning the knurled lens holder 36. (For general use at the same distance these are preset adjustments.) The battery push button switch 29 is depressed by the first finger of the left hand (this can only be depressed if the operating knob 8 is in the "in" position). The operating knob 8 is rotated by the other hand until a brightness match is obtained between the filament and the object. The operating knob 8 is then pulled out and adjusted until the galvanometer is balanced. The temperature can then be read off on the appropriate range scale, no trimmer rheostat being provided.

In order to change the range the filter shutter 40 is turned by means of knob 41 to bring the appropriate filter 39 into position.

Referring to the wiring diagram in Figure 6 the bridge circuit contains two fixed ratio arms 45, 46 mounted on the plate 2 (Figs. 2 and 4), the ratio being 300 to 500. A third arm is formed by series resistances 47, 48 also mounted on the plate 2, and the part of the slide wire 1 up to the brush 15, the fourth arm being constituted by the remainder of the slide wire 1 and the comparison lamp 49. A shunt 50 is connected across the slide wire 1 for calibration purposes.

The galvanometer 24 is connected between the junction of the ratio arms 45, 46 and the slide wire brush 15.

The resistance 47 is of nickel to compensate for variations in the ambient temperature and connected across the bridge arms which contain the lamp 49 and the resistances 47, 48 is a circuit containing the battery switch contacts 25 and battery 25a in series with the rheostat 4, the mechanical coupling between the rheostat brush 19 and the slide wire brush 15 being indicated at 51.

The rheostat 4 is wound on a tapered former so that its resistance follows a parabolic law such that the galvanometer is maintained approximately in balance over the whole scale.

I claim:

1. In an optical pyrometer, the combination of a casing, a support fixedly mounted within said casing, a slide wire extending in a circular arc and fixed on said support, a rheostat fixed on said support concentrically with said slide wire, a disc mounted within said casing both for rotation relatively to said support and for axial movement relatively thereto, a galvanometer contact carried by said disc and engaging said slide wire, a carrier rotatably mounted within said casing, a contact mounted on said carrier and engaging said rheostat, a clutch element on said carrier, a co-operating clutch element carried by said disc, a bridge circuit including two ratio arms, means electrically connecting one end of said slide wire to one of said ratio arms, an electrical connection between the other end of said slide wire and the other of said ratio arms, a lamp including in said electrical connection, said lamp having a filament, means for comparing the brightness of an object of which the temperature is to be measured, with the brightness of the lamp filament, a galvanometer, means connecting one terminal of said galvanometer to said galvanometer contact, means connecting the other terminal of said galvanometer to the junction of said ratio arms, a circuit connecting said rheostat in shunt with said slide wire and said lamp, a battery in said circuit, and an operating member on said disc whereby said disc may be moved axially to effect engagement of the clutch elements and then rotated to take the carrier with it to effect simultaneous movement of the galvanometer contact with the rheostat contact along the slide wire and the rheostat respectively after which the clutch elements can be disengaged by reverse axial movement of the disc and the galvanometer contact can be moved independently of the rheostat contact by further rotation of the disc.

2. An optical pyrometer according to claim 1, including a battery switch mounted on the support, a latch pivoted to the support and normally holding the battery switch in open position, a latch releasing member carried by the support and positioned for actuation by the disc in the clutch engaging direction, and means on said battery switch to render said latch ineffective after said switch has been moved to closed position.

References Cited in the file of this patent

UNITED STATES PATENTS 2,252,015    Machler _____ Aug. 12, 1941

FOREIGN PATENTS 636,544    Great Britain _____ May 3, 1950